United States Patent [19]

Goetz et al.

[11] Patent Number: 4,605,114

[45] Date of Patent: Aug. 12, 1986

[54] VIBRATION DAMPING CLUTCH AND PINION ASSEMBLY

[75] Inventors: Oliver R. Goetz, Greencastle, Pa.; Richard D. Schnurr, Williamsport; Victor Kronstadt, Hagerstown, both of Md.

[73] Assignee: Mack Trucks, Inc., Allentown, Pa.

[21] Appl. No.: 692,496

[22] Filed: Jan. 18, 1985

[51] Int. Cl.[4] .................... F16D 3/14; F16D 3/66
[52] U.S. Cl. .................... 192/106.2; 192/110 S; 464/63
[58] Field of Search ............ 192/70.17, 70.2, 70.28, 192/106.1, 106.2, 110 R, 110 S; 464/63, 64, 68, 97, 179

[56] References Cited

U.S. PATENT DOCUMENTS

| 1,952,620 | 7/1978 | Dantele | 192/106.2 |
|---|---|---|---|
| 3,007,350 | 11/1961 | Wiseman | 464/97 X |
| 3,101,600 | 8/1963 | Stromberg | 464/63 |
| 3,159,987 | 12/1964 | Thompson et al. | 464/97 |
| 3,776,337 | 12/1973 | Yoshizawa | 192/110 R |
| 4,239,097 | 12/1980 | Greacen et al. | 192/106.2 |
| 4,254,855 | 3/1981 | Hildebrand et al. | 192/106.2 |
| 4,347,717 | 9/1982 | Lamarche | 464/64 |
| 4,351,167 | 9/1983 | Hanke et al. | 464/24 |
| 4,352,420 | 10/1982 | Maycock | 192/106.2 |
| 4,410,075 | 10/1983 | Caray et al. | 192/106.2 |
| 4,475,640 | 10/1984 | Takeuchi et al. | 192/106.2 |

Primary Examiner—George H. Krizmanich
Assistant Examiner—James J. Merek
Attorney, Agent, or Firm—Bernard, Rothwell & Brown

[57] ABSTRACT

A very low spring rate vibration-damping clutch and pinion assembly for lowering the resonance of a power train to below the resonant speed of the engine includes a vibration damping clutch with two circumferential rows of springs and a necked-down pinion shaft. The vibration damper is preferably connected to both the pinion shaft and the clutch disk by spline connections.

8 Claims, 4 Drawing Figures

VIBRATION DAMPING CLUTCH AND PINION ASSEMBLY

BACKGROUND OF THE INVENTION

1. Field of the Invention

This invention relates to an improved very low spring rate, vibration-damping clutch and pinion assembly particularly adaptable for use with heavy-duty, high torque rise, slow-speed engines.

2. Prior Art

The high torque rise, slow speed engines currently in use on heavy-duty trucks and otherwise in industry, produce torsional impulses which are sufficient to put the power train in resonance at engine operating speeds. Resonance within an engine's operating speed is highly undesirable as it causes clutch wear, loss of power and vibration such that vibration can be actually felt even by the driver of the truck. Accordingly, various measures have been taken to prevent resonance of the power train within the operating speed of the engine.

One such prior art measure is to add inertia to the drive line. This has been done in Mack trucks by adding a drive line fly wheel before the input to the driven axle or behind the transmission. A drive line flywheel could also be used in combination with a vibration damping clutch. However, adding a drive line flywheel is not the most desirable solution to the problem as it adds extra weight, and causes problems of access and appearance.

Another approach to the problem is the use of a vibration-damping clutch. One vibration-damping clutch is disclosed in U.S. Pat. No. 4,254,855 granted Mar. 10, 1981. However, this clutch with only a single row of coaxial spring dampers cannot be made to have a sufficiently low spring rate to adequately provide the required damping effect for some engines. In order to minimize or prevent the spring dampener from bottoming out they often have dampers so stiff that they act as torque peak clippers and not vibration controllers.

Accordingly, there is a significant need in the art for a very low spring rate vibration-damping assembly which does not utilize added inertia weights or extra bulky components.

A SUMMARY OF THE INVENTION

This invention provides a very low spring rate vibration-damping clutch and pinion assembly. In one embodiment the vibration-damping clutch utilizes multiple circumferential rows of springs in the vibration dampener to provide a low torsional spring rate without compromising capacity. While this provides a low spring rate clutch it still does not provide enough of a low spring rate alone to take the resonant speed outside of the operating speed of certain engines. Accordingly, the low spring rate vibration-damping clutch is combined with a necked-down pinon shaft which is significantly less stiff than a conventional clutch pinion shaft. The softer (less stiff) pinion shaft and the very soft, multiple spring row, vibration-damping clutch in combination provides an overall low spring rate which will take the resonant speed of the power train outside the operating speed range of the engine by lowering it. Additionally, in the preferred embodiment the multiple circumferential spring rows have a construction which essentially separates the spring damper assembly from the clutch disk to allow a more universal application by splining the driven members to the disk to allow maximum use of axial space. With the spline connection the clearances between members are not affected by wear on the clutch disk facing and the often troublesome rivets commonly used for damper assembly retention are replaced with closely controlled spline fits and snap rings. In a second embodiment the clutch damping assemblies can be integral with the clutch-driven disk.

DETAILED DESCRIPTION OF PREFERRED EMBODIMENTS

Figure 1:
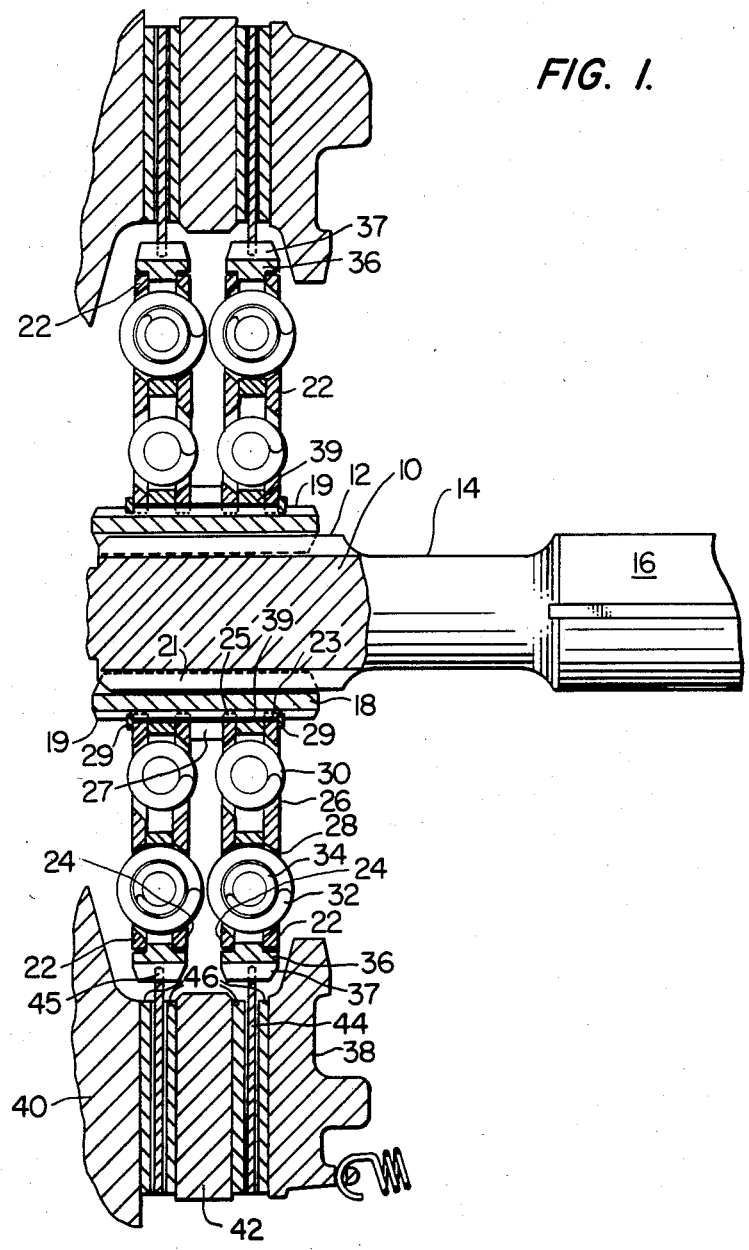
FIG. 1 is a partially broken away side elevation view of a clutch and pinion shaft assembly according to this invention.

With reference to FIG. 1, the normal components of a clutch including the fly wheel driving input shaft, the pressure plate, the clutch housing and bearings and support have been omitted for the sake of clarity and because such form no part of this invention and can be the type as is commercially available and well known in the art.

In the preferred embodiment a clutch pinion shaft 10 has splines 12 thereon to be driven by the driven member of the clutch. The pinion output shaft 10 has a significantly reduced diameter "necked-down" portion 14 adjacent splined section 12 and a full diameter portion 16 connected to the transmission as is well known in the art. The necked-down area 14 provides the pinion shaft 10 with about half the stiffness that it would have without the necked-down portion 14. In the embodiment shown, the stiffness of the shaft is about $0.93 \times 10^6$ inch-pounds per radian, about half as stiff as the presently used shaft. This is an important feature of the invention as such shaft is used in combination with the spring vibration-damping clutch in order to achieve a sufficiently low spring rate.

Figure 2:
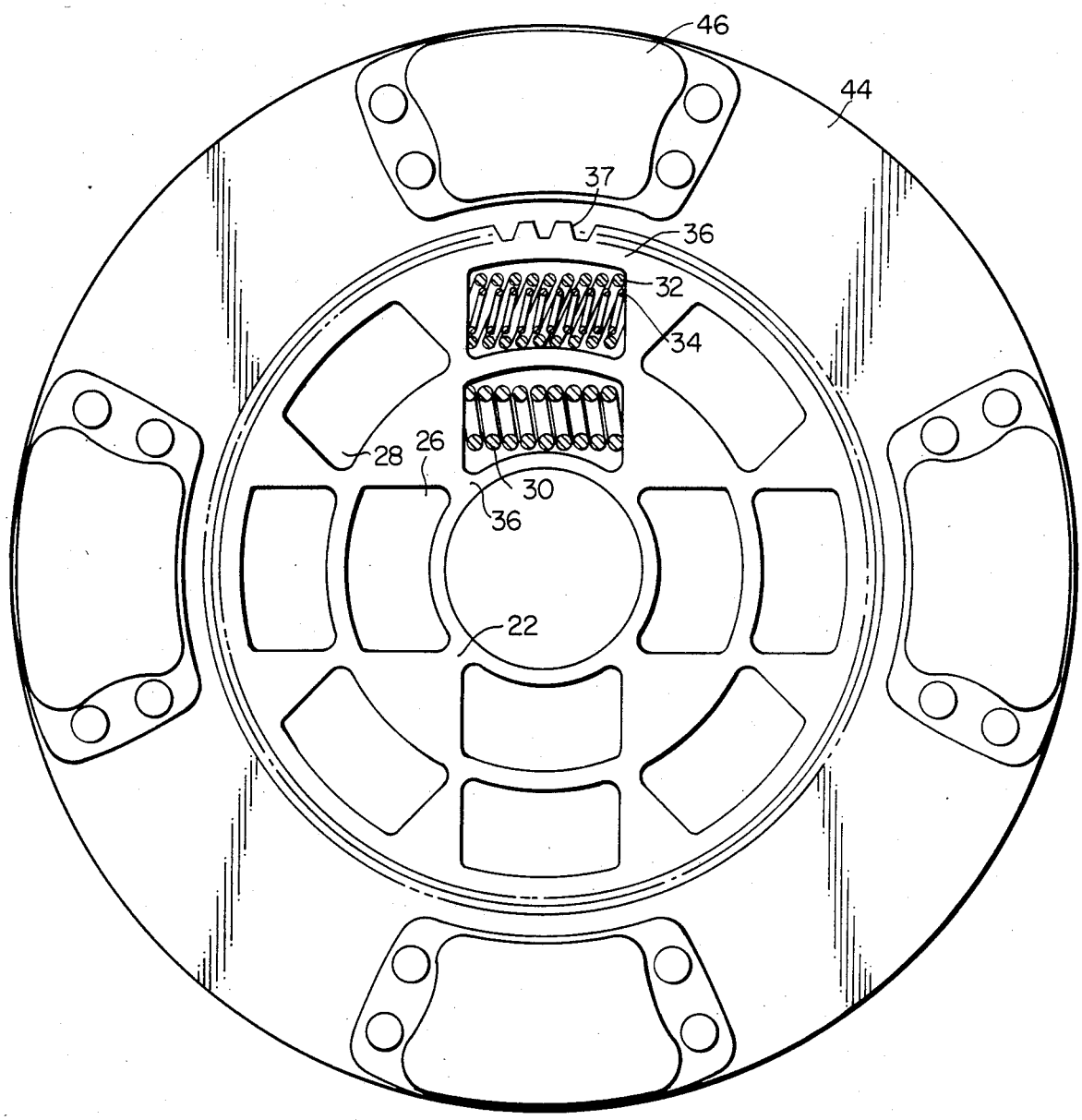
FIG. 2 is an end elevation view partially broken away of the spring damper assembly shown in FIG. 1.

The surrounding of the splined section 12 of the pinion shaft is a sleeve 18 with splines 19 on the outer diameter thereof and splines 21 on the inner diameter thereof. Outer hubs or covers 22 and inner hubs or covers 24 have splines 23 and 25, respectively, at their inner diameters for cooperating with the splines 19 on the sleeve 18. Both covers 22 and 24 have an inner circumferential row of openings 26 and an outer circumferential row of openings 28, see FIG. 2.

The spring damping is provided by two circumferential rows of springs which can either be single or coaxial springs. In a preferred embodiment, within the inner peripheral row of openings 26 there are single springs 30. Within the outer row of circumferential openings 28 there are coaxial springs 32 and 34 in each opening. Springs are not shown in each of the openings 26 and 28 of FIGS. 2 and 4 merely for the sake of simplifying the drawing.

Between the covers 22 and 24 there is provided a disk-shaped, partially hollow hub 36 having splines 37 on its outer periphery and having openings therein for accommodating the springs 30, 32 and 34. The inner periphery of the hub is smooth and extends near to the outer diameter of the splines 19 on sleeve 18 so as to leave a small gap 39 for clearance.

In the two-disk clutch illustrated in FIG. 1 there is provided a spacer 27 in the center between the inner covers 24, 24 and a pair of snap rings 29, 29 one snap ring on each outer side positioned within a close tolerance groove through the splines 19 so as to hold the whole assembly together on the sleeve 18.

Clutch plate 38 and fly wheel 40 and clutch intermediate plate 42 are generally known and of a construction known in the art. Clutch disk 44 has segmented ceramic clutch pads 46 thereon and is formed with teeth 45 on its inner periphery to cooperate with splines 37 on inner hub 36.

In operation, when the clutch plates frictionally clamp the clutch pads on clutch disk 44, disk 44 is driven, driving inner hub 36 through connection 45,37. The inner hub 36 drives the springs 30, 32, 34 which in turn drive the inner and outer covers 24 and 22. These covers, being splined to the sleeve 18 which in turn is splined to the pinion 10, complete the drive connection to the pinion 10.

The multiple circumferential rows of springs provide a low torsional spring rate without compromising capacity. Coaxial springs are used on the outside to get strength and capacity. In the preferred embodiment there is no positive stop such as disclosed in U.S. Pat. No. 4,254,855, and none is required. By using the spline connections the entire damper assembly including hub 36, covers 22, 24 and springs 30, 32 and 34 is separable, and the clutch disk 44 with its pads 46 can be replaced without replacing the damper assembly. Moreover, the splining of the disk 44 to the hub 36 allows the disk to move axially independent of the damper and thus wear on the clutch facings does not affect the damper or the rest of the clutch. An additional important feature is the assembly with snap rings 29 and elimination of riveting to hold the damper assembly together. Rivets are not the most reliable connections considering the high torque applied to clutches, and in riveted construction such as U.S. Pat. No. 4,254,855 the rivets carry all the torque. Moreover, there is very low internal friction between the cover plates 22, 24 and the hub 26 and the spring connections as compared to the prior art. The internal friction between the spring connections and between the plates of the damper in the prior art is not controllable and results in wear. With this invention one is not faced with the problem as the drive is totally through the springs.

Using this construction a very low spring rate was obtained, specifically $0.136 \times 10^6$ inch-pounds per radian for a two-disk clutch. This is compared with a conventional spring damper clutch now in use which has a spring rate of $0.46 \times 10^6$ inch-pounds per radian for a two-disk clutch. The spring rate needed to take the resonant speed outside the speed range of the engine depends somewhat upon the engine power train; however in one specific embodiment for Mack trucks the spring rate needed was $0.12 \times 10^6$ inch-pounds per radian which was below even that obtained by the very low spring rate clutch shown in the preferred embodiment. However, combined with the necked-down pinion shaft which had a spring rate of $0.93 \times 10^6$ inch-pounds per radian such low spring rate was achievable.

The springs of course can be changed to provide different spring rates as required.

Figure 3:
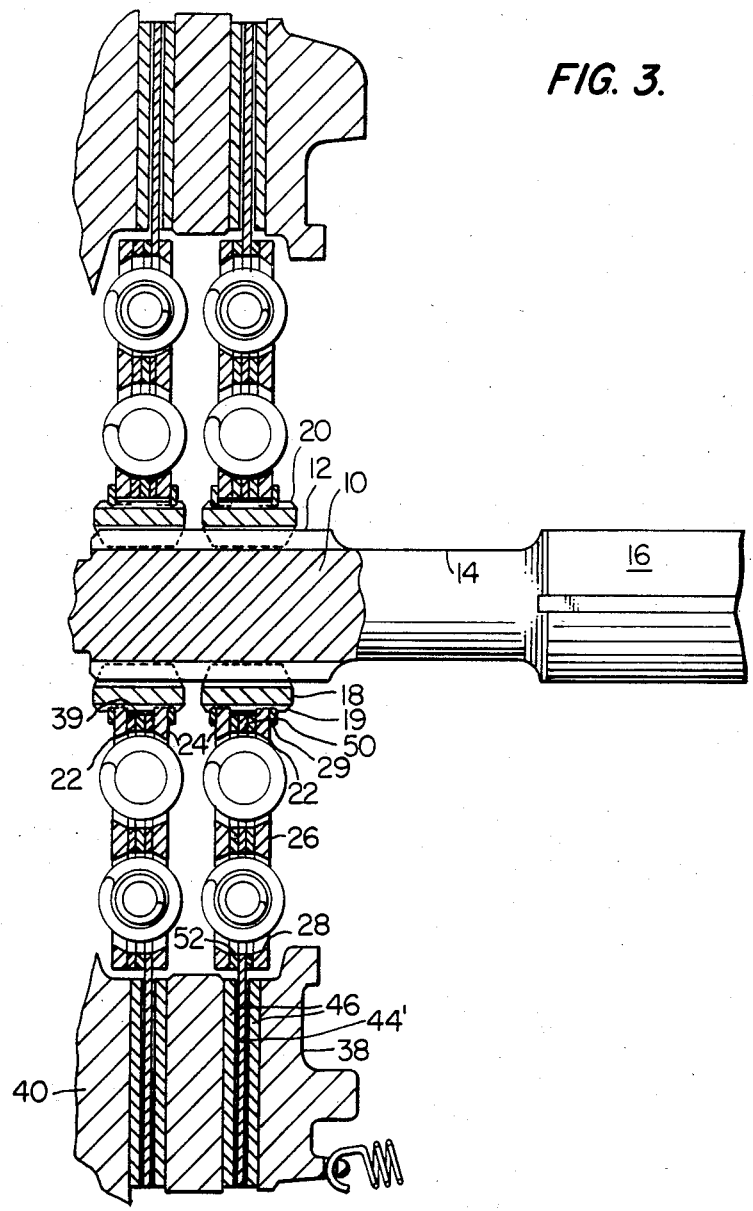
FIG. 3 is a side elevation view partially in section of the clutch disk and pinion shaft assembly of an alternative embodiment of this invention.
Figure 4:
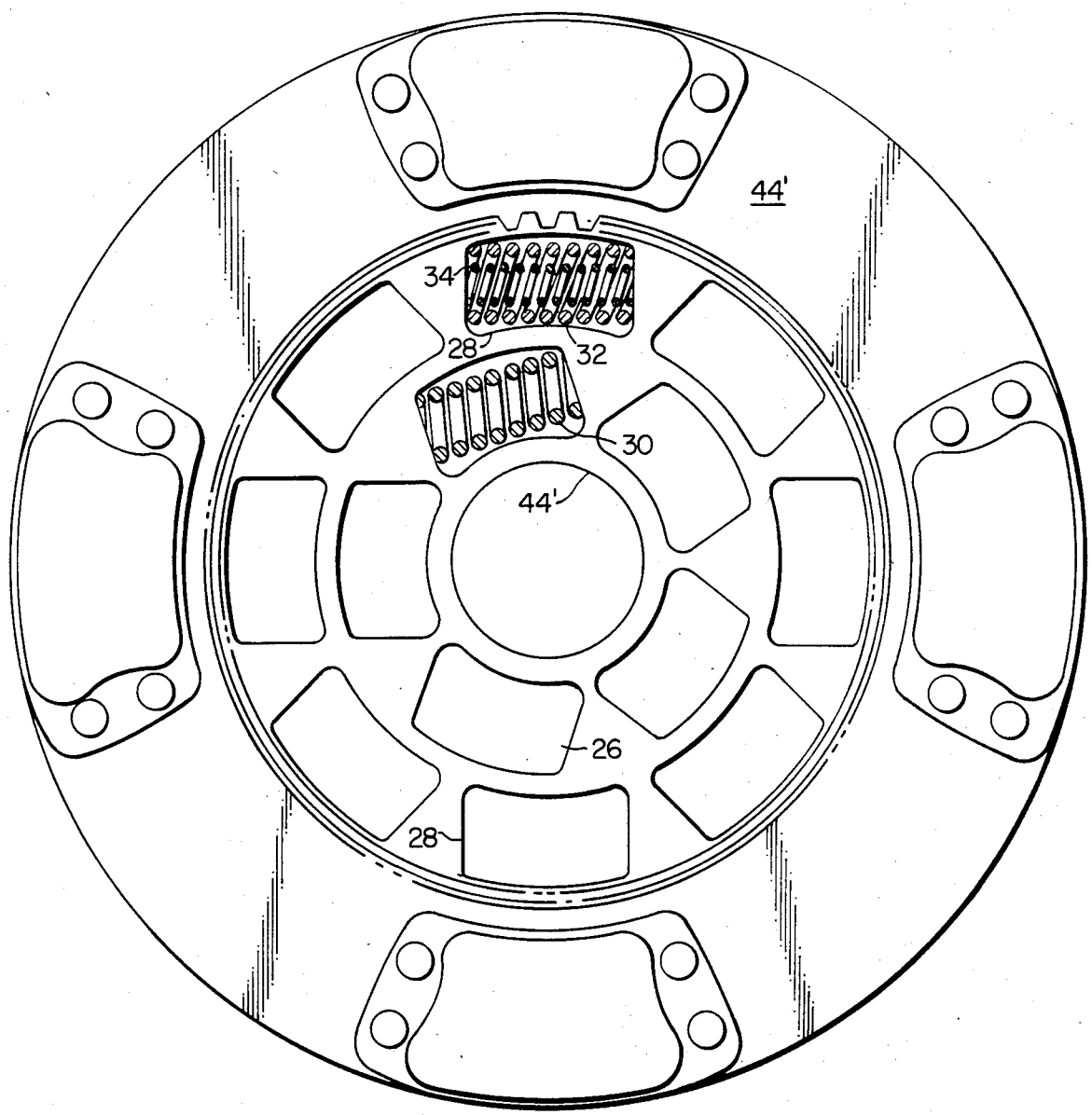
FIG. 4 is an end elevation view of the damper assembly and clutch disk of the FIG. 3 embodiment.

With reference to FIGS. 3 and 4, parts which are identical to the previously described preferred embodiment bear the same reference numbers. The FIGS. 3-4 version includes however the multiple circumferential rows of springs integral with the clutch disk. More specifically clutch disk 44' having clutch pads 46 extends inwardly almost to the outer splines 19 of sleeve 18 leaving gap 39. Instead of a hub between the inner and outer covers 22 and 24 are a pair of stack plates 50 and 52 which are rigidly attached to the clutch disk 44' by any suitable means. There is no spacer between the two-clutch disk assembly and the snap rings 29 are positioned on the outside of the cover plates 22 and 24 for each clutch disk. This embodiment is similar to the preferred embodiment in utilizing multiple circumferential spring rows to achieve a low torsional spring rate combined with the necked down pinion shaft to provide an assembly which can have a spring rate to take the drive train outside of the resonance of the engine at operating speed. However, by having the clutch disk integral with the damper assembly certain other benefits which derive from the preferred embodiment (as discussed above) will not be obtained.

We claim:

1. A clutch and pinion vibration-damping assembly for use with a drive train of a heavy-duty, high torque rise, slow speed engine and producing a very low spring rate, the assembly comprising; a clutch having a driving member including a disk and a driven member including a hub, a very low spring rate vibration damper connecting the clutch driving member to the clutch-driven member, the vibration damper including multiple circumferential rows of springs constituting the sole normal drive connection between the disk and the hub, in combination with a pinion output shaft drivingly connected to the clutch-driven member through spline connecting means, the output shaft having a necked-down portion so that the spring rate of the multiple spring row vibration damper and the necked-down output shaft take the resonant speed of the drive train lower than the operating speed of the engine.

2. A clutch and pinion vibration damping assembly for use with a heavy-duty, high torque rise, slow speed engine and providing very soft vibration damping, the assembly comprising; a pinion shaft having a necked-down portion thereof to be significantly less stiff than a pinion shaft without such necked-down portion, a clutch-driven spline sleeve splined to the pinion shaft, a driven clutch disk freely rotatable with regards to the clutch-driven sleeve, and a multiple spring row vibration damper assembly drivingly connecting the clutch disk to the clutch-driven spline sleeve, the vibration damper including multiple circumferential rows of springs constituting the sole normal drive connection between the disk and the spline sleeve.

3. A clutch and pinion vibration damping assembly as defined in claim 2 wherein the vibration damper assembly includes multiple circumferential spring rows, one row outside the other.

4. A clutch and pinion vibration damping assembly as in claim 3 further comprising cover plates on the sides of the spring rows which cover plates are connected to the clutch-driven splined sleeve have openings therein to accommodate the springs.

5. A clutch and pinion vibration damping assembly as defined in claim 4 wherein the cover plates are held axially in place on the spline sleeve by snap ring means.

6. A clutch and pinion vibration damping assembly as in claim 5 wherein the clutch disk is splined to a hub member so that the vibration damper assembly may be removable separably from the clutch disk and the clutch disk may move axially relative to the damper assembly upon wear of the clutch facing without affecting the position of the damper assembly.

7. A clutch and pinion vibration damping assembly as defined in claim 5 wherein the clutch disk has an inner periphery which extends to near the spline sleeve and further comprising spacer plates on each side of the clutch disk and rigidly attached thereto with openings to accommodate the springs.

8. A clutch and pinion vibration damping assembly for use with a drive train of a heavy-duty, high torque rise, slow speed engine, such assembly producing a very low spring rate, the assembly comprising: a clutch having a pair of parallel driving members and a pair of corresponding driven members, a very low spring vibration damper connecting each of the clutch driving members in parallel to the corresponding clutch-driven members, the vibration dampers including multiple circumferential rows of springs constituting the sole drive connection in combination with a pinion output shaft drivingly connected to the clutch-driven members through a connecting spline, the output shaft having a necked-down portion so that the spring rate of the vibration dampers and the necked-down output shaft take the resonant speed of the drive train lower than the operating speed of the engine, such spring rate being in the order of $0.12$ times $10^6$ inch-pounds per radian.

* * * * *